(12) United States Patent
Escamilla et al.

(10) Patent No.: US 10,571,977 B2
(45) Date of Patent: Feb. 25, 2020

(54) TECHNOLOGIES FOR HINGES FOR DUAL SCREEN DEVICES

(71) Applicant: Intel Corporation, Santa Clara, CA (US)

(72) Inventors: Eduardo Escamilla, Round Rock, TX (US); James Utz, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/229,395

(22) Filed: Dec. 21, 2018

(65) Prior Publication Data

US 2019/0146561 A1 May 16, 2019

Related U.S. Application Data

(60) Provisional application No. 62/610,409, filed on Dec. 26, 2017.

(51) Int. Cl.
| | |
|---|---|
| *G06F 1/16* | (2006.01) |
| *E02D 3/12* | (2006.01) |
| *E05D 11/10* | (2006.01) |
| *E05D 11/00* | (2006.01) |
| *E05D 3/12* | (2006.01) |

(52) U.S. Cl.
CPC ............ *G06F 1/1681* (2013.01); *E05D 3/122* (2013.01); *E05D 11/105* (2013.01); *G06F 1/1616* (2013.01); *G06F 1/1647* (2013.01); *E05D 11/0054* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,258,914 | B2* | 2/2016 | Koser | G06F 1/1616 |
| 9,309,707 | B2* | 4/2016 | Wikander | E05D 3/06 |
| 9,534,432 | B2* | 1/2017 | Lee | G06F 1/1681 |
| 9,625,952 | B2* | 4/2017 | Holung | G06F 1/1681 |
| 9,677,308 | B1* | 6/2017 | Chen | E05D 3/18 |
| 9,684,343 | B2* | 6/2017 | Tazbaz | G06F 1/1637 |
| 9,714,533 | B2* | 7/2017 | Kuramochi | E05D 3/12 |
| 9,798,359 | B2* | 10/2017 | Seo | G06F 1/1652 |
| 9,845,625 | B2* | 12/2017 | Park | F16C 11/10 |
| 9,857,834 | B2* | 1/2018 | Hampton | G06F 1/1681 |
| 9,857,849 | B1* | 1/2018 | Siddiqui | G06F 1/1616 |
| 9,915,086 | B2* | 3/2018 | Kato | E05D 11/087 |
| 9,983,637 | B1* | 5/2018 | Morrison | G06F 1/1681 |
| 10,120,415 | B2* | 11/2018 | Seo | G06F 1/1652 |
| 10,296,044 | B2* | 5/2019 | Siddiqui | H04M 1/022 |

(Continued)

*Primary Examiner* — Lisa Lea-Edmonds
(74) *Attorney, Agent, or Firm* — Barnes & Thornburg LLP

(57) ABSTRACT

Technologies for hinges on mobile compute devices with dual screens are disclosed. In the illustrative embodiment, the mobile compute device with two housings each having a display are connected to each other by a hinge with elliptical spur gears that allow for one housing with a display to be rotated 360 degrees relative to the other housing. The elliptical shape of the spur gears allows the separation between the gears to change as one housing is rotated and, in particular, allows a smaller separation between the gears in certain configurations of the mobile compute device. The illustrative hinge includes a mechanical linkage system that allows the hinge to expand and contract as one housing is rotated.

20 Claims, 5 Drawing Sheets

(56) References Cited

U.S. PATENT DOCUMENTS

| | | | |
|---|---|---|---|
| 10,317,934 B2* | 6/2019 | Hampton | G06F 1/1601 |
| 2017/0192467 A1* | 7/2017 | Holung | E05D 3/122 |
| 2018/0067520 A1* | 3/2018 | Maatta | G06F 1/1681 |
| 2018/0120895 A1* | 5/2018 | Tucker | G06F 1/1618 |
| 2018/0224897 A1* | 8/2018 | Tucker | E05D 1/06 |
| 2019/0050028 A1* | 2/2019 | Chung | G06F 1/1681 |
| 2019/0079561 A1* | 3/2019 | Park | G06F 1/1652 |
| 2019/0094917 A1* | 3/2019 | Schmelzle | F16C 11/04 |

* cited by examiner

TECHNOLOGIES FOR HINGES FOR DUAL SCREEN DEVICES

CROSS-REFERENCE TO RELATED APPLICATIONS

The present application claims the benefit of U.S. Provisional Patent Application No. 62/610,409, filed Dec. 26, 2017.

BACKGROUND

Mobile compute devices come in a variety of forms, including cell phones, laptops, and tablets. Some mobile compute devices may fit into more that one category, such as a laptop with a display that can be folded 360 degrees and convert from a laptop-like configuration to a tablet-like configuration. Some mobile compute devices have a second display where a keyboard may otherwise be and allow for both of the displays to be laid flat like an open book. In such a configuration, there may be a gap between the two displays.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
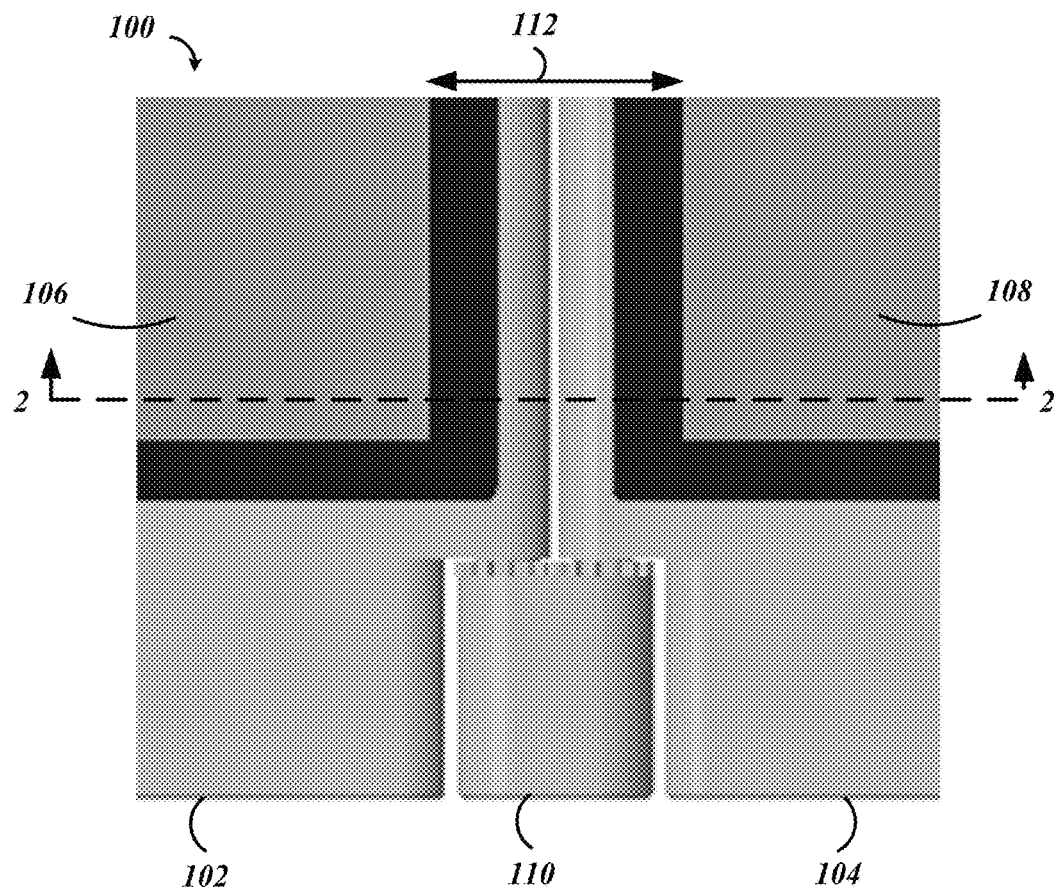
FIG. 1 is a top view of one embodiment of a dual display mobile compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 shows a top view of a mobile compute device 100, which has a bottom housing 102 and a top housing 104. The top housing 104 is connected to the bottom housing 102 by a hinge 110, allowing the top housing 104 to move relative to the bottom housing 102. Such a configuration is similar to, e.g., a laptop, which may have a keyboard on a bottom housing and a display on a top housing. The illustrative mobile compute device 100, however, has a first display 106 on the bottom housing 102 and a second display 108 on the top housing 104.

The display 106 and display 108 may be any suitable display, such as a touchscreen display, a liquid crystal display, an LED display, etc. On top of the display 106 and display 108, there may be a cover 206 and a cover 208, respectively, (see FIG. 2), such as a glass or plastic cover. The cover 206, 208 may incorporate a touchscreen, such as a resistive or capacitive touchscreen. There is a gap 112 between the first display 106 and the second display 108.

Figure 2:
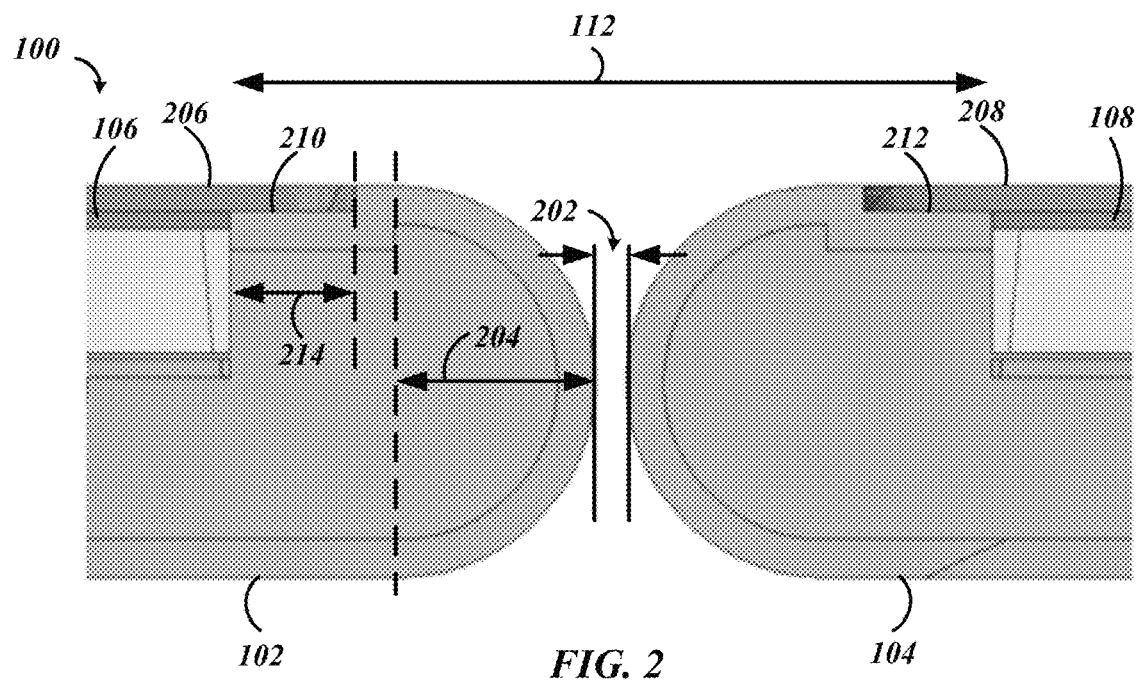
FIG. 2 is a cross-sectional side view of one embodiment of a dual display mobile compute device.
Figure 3A:
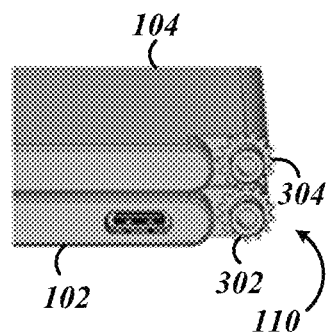
FIG. 3A is a view of a dual display mobile compute device in a closed configuration.
Figure 3B:
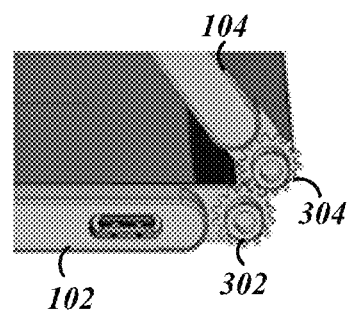
FIG. 3B is a view of a dual display mobile compute device in a partially open configuration.
Figure 3C:
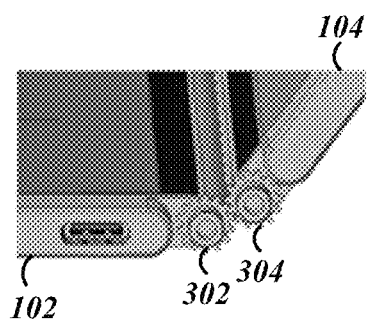
FIG. 3C is a view of a dual display mobile compute device in a notebook or laptop configuration.
Figure 3D:
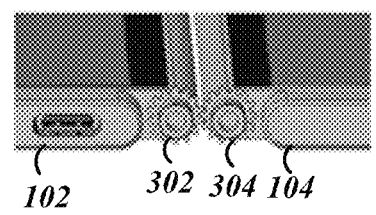
FIG. 3D is a view of a dual display mobile compute device in a book configuration.
Figure 3E:
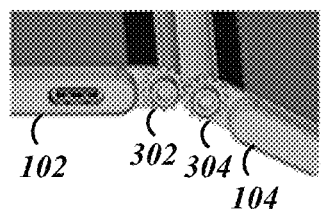
FIG. 3E is a view of a dual display mobile compute device in transition from the book configuration to a tablet configuration.
Figure 3F:
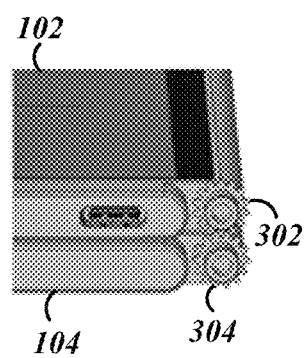
FIG. 3F is a view of a dual display mobile compute device in a tablet configuration.

FIG. 2 shows a side view of a cross-section of the illustrative mobile compute device 100 with the top housing 104 unfolded from the bottom housing 102. T As shown above in FIG. 1, there is a gap 112 between the display 106 and the display 108. The gap 112 is due to several sources. There is a gap 202 between the bottom housing 102 and the top housing 104. The illustrative mobile compute device 100 has rounded edges where the bottom housing 102 is adjacent to the top housing 104, which may facilitate the ability of the top housing 104 to be rotated 360° relative to the bottom housing 102. However, the rounded edges lead to a separation between the housings 102, 104 equal to twice the radius 204 of curvature of the edge. Additionally, a region of each cover 206, 208 of the displays 106, 108 may adhered to the corresponding housing 102, 104 at an adhesive area 210, 212.

Referring now to FIG. 3, the illustrative hinge 110 may be made up of a bottom circular spur gear 302 and a top circular spur gear 304, which permit the top housing 104 to be rotated 360° relative to the bottom housing 102. In the illustrative embodiment, the bottom gear 302 is fixed to the bottom housing 102 and cannot rotate relative to the bottom housing 104, and the top gear 304 is fixed to the top housing and cannot rotate relative to the top housing 104. FIG. 3A shows the mobile compute device 100 in a closed configuration. FIG. 3B shows the mobile compute device 100 in a partially open configuration, with the top housing 104 rotated approximately 45° relative to the bottom housing 102. FIG. 3C shows the mobile compute device 100 in a notebook or laptop configuration, which is mostly open with the top housing 104 rotated approximately 120° relative to the bottom housing 102. FIG. 3D shows the mobile compute device 100 in a book configuration, which is completely open with the top housing 102 rotated approximately 180° relative to the bottom housing 104. FIG. 3E shows the mobile compute device 100 transitioning from the book configuration to a tablet configuration, which is mostly open with the top housing 102 rotated approximately 200° relative to the bottom housing 102. FIG. 3F shows the mobile compute device 100 in a tablet configuration, which is a configuration in which the top housing 104 is rotated 360° relative to the bottom housing 102. While the top housing 104 and the bottom housing 102 are in the same angle relative to each other in the tablet configuration in FIG. 3F as in the close configuration in FIG. 3A, it should be appreciated that the displays 106, 108 are inaccessible in the closed configuration and are accessible in the tablet configuration. It should be appreciated that the distance between the center of the top gear 304 and the center of the bottom gear 302 is fixed and does not change as the top housing 104 is rotated. It should further be appreciated that the distance between the centers of the gears 304, 306 must be at least the thickness of the top and/or bottom housing 102, 104. As a result, there is a limit to the size of the gap 112 shown in FIG. 1 in such embodiments.

Figure 4:
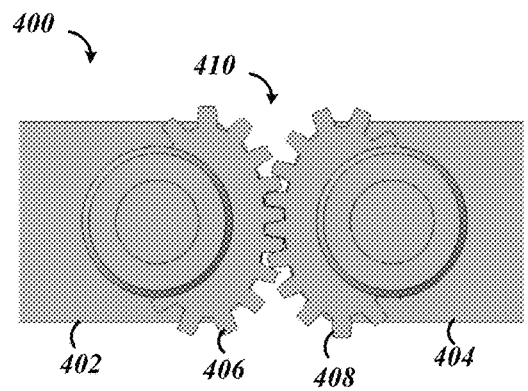
FIG. 4 is a side view of one embodiment of a dual display mobile compute device with an elliptical gear hinge.
Figure 5:
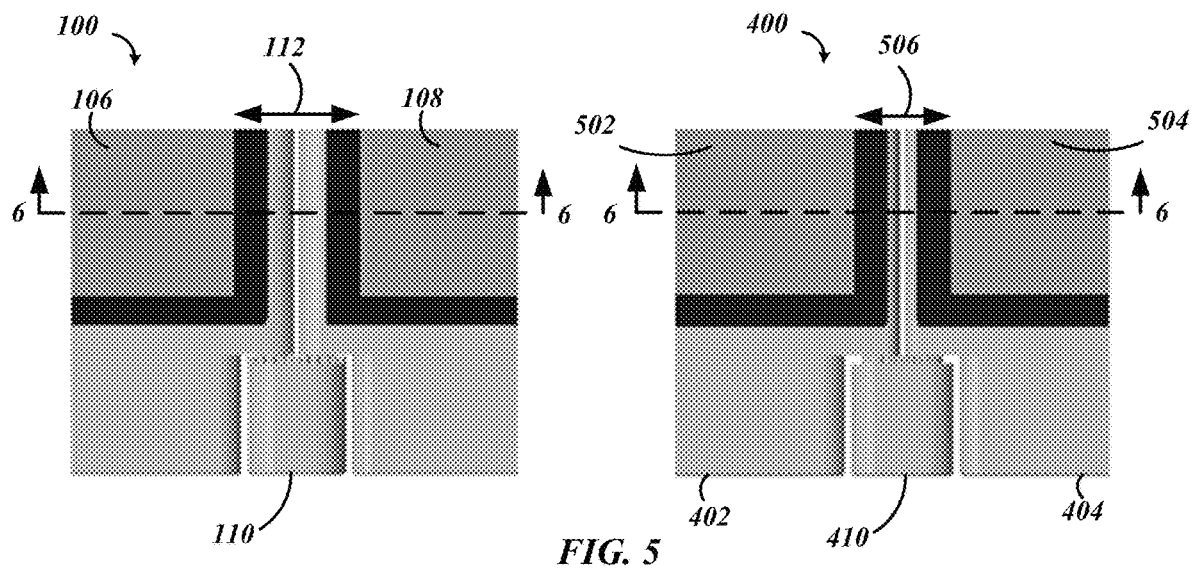
FIG. 5 is a top view of one embodiment of a dual display mobile compute device with circular hinges and a top view of one embodiment of a dual display mobile compute device with elliptical hinges.
Figure 6:
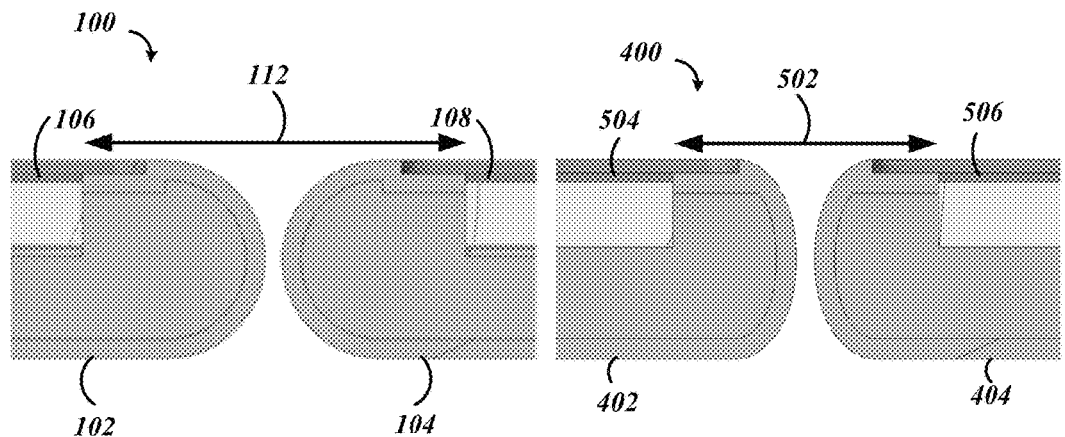
FIG. 6 is a cross-sectional side view of one embodiment of a dual display mobile compute device configured for use with circular hinges and a side view of one embodiment of a dual display mobile compute device configured for use with elliptical hinges.

Referring now to FIGS. 4-6, in order to address the limit to the size of the gap 112 shown in FIG. 1, a non-circular gear such as an elliptical spur gear may be used. FIG. 4 shows a side view of one embodiment of a mobile compute device 400 with elliptical spur gear 406 and 408 which form a hinge 410. Like the mobile compute device 100, the mobile compute device 400 includes a bottom housing 402 and a top housing 404. It should be appreciated that referring to one housing as a "bottom" housing 402 and one housing as a "top" housing 404 merely refers to the positions of the housings in one possible configuration, such as the closed configuration shown in FIG. 3A in regard to the mobile compute device 100. However, since the housings can rotate with respect to each other, the names are not limiting to their relative positions in any given configuration. The hinge 410 joining the housings 402, 404 is disposed at one corner of each housing 402, 404 and joins the two housings 402, 404 such that one edge of the bottom housing 402 is adjacent to one edge of the top housing in a book configuration. In the illustrative embodiment, a second hinge 410 is disposed at the opposite end of the edges of the housings 402, 404 that are adjacent to each other. The illustrative bottom housing 402 includes an elliptical spur gear 406 that is fixed in position and angle relative to the bottom housing 402, and the illustrative top housing 404 includes an elliptical spur gear 408 that is fixed in position and angle relative to the top housing 404. Each elliptical spur gear 406, 408 has a major axis and a minor axis, with the major axis being longer than the minor axis. It should be appreciated that the distance between the center of the gear 406 and the center of the gear 408 is less when the gears mesh where the teeth are separated from the center of the corresponding gear 406, 408 by the minor axis and the distance between the center of the gear 406 and the center of the gear 408 is greater when the gears mesh where the teeth are separated from the center of the corresponding gear 406, 408 by the major axis. As shown in FIG. 4, when the mobile compute device 400 is in the book configuration, the gears 406, 408 mesh along a housing of each gear 406, 408 that is separated from the center of the corresponding gear 406, 408 by the minor axis. In a closed configuration (see FIG. 7B), the gears 406, 408 mesh along a housing of each gear 406, 408 that is separated from the center of the corresponding gear 406, 408 by the major axis. The length of the major axis will depend on the thickness of the housings 402, 404. In the illustrative embodiment, the length of the major axis is equal to the thickness of the housings 402, 404. The length of the minor axis may be less than the major axis, such as ¼ to ½ of the length of the major axis.

Although the illustrative hinge 410 includes elliptical spur gears 406, 408, in some embodiments, the hinge 410 may include gears of a different, non-circular shape that provide a separation distance between the centers of the gears that varies depending on the relative orientation of the gears. For example, the hinge 410 may include gears with a superellipse shape.

In the illustrative embodiments, the gears 406, 408 may be made of a material that can withstand a high amount of stress, such as steel, titanium, iron, metallic alloys, etc. Additionally or alternatively, in some embodiments, the gears 406, 408 may be made of a different suitable material, such as a plastic, aluminum, etc. The illustrative gears 406, 408 have spur teeth. Additionally or alternatively, in some embodiments, the gears 406, 408 may include teeth that are in a configuration different from spur teeth, such as helical gears or bevel gears. In the illustrative embodiment, the gears 406, 408 may have as many teeth as is required to allow the top housing 404 to rotate 360° relative to the bottom housing 402. For example, each gear 406, 408 may have teeth on approximately half of the gear 406, 408, from one point on the gear 406, 408 that is the semi-major axis away from the center of the gear 406, 408 to another point on the other side of the gear 406, 408 that is also the semi-major axis away from the center of the gear 406, 408.

Similar to the mobile compute device 100, the mobile compute device 400 may be any suitable mobile compute device, such as a tablet, a laptop, a cellphone, an e-reader, and/or the like. The mobile compute device 400 may include a processor, a memory, input/output devices, and various other components, which are not described in detail in the interest of clarity. In some embodiments, only one the top housings 404 may have a display, and the housing 402 may have other components instead of a display, such as a keyboard. It should be appreciated that referring to one housing as a "bottom" housing 402 and one housing as a "top" housing 404 merely refers to the positions of the housings in one possible configuration, such as the closed configuration shown in FIG. 3A in regard to the mobile compute device 100. However, since the housings can rotate with respect to each other, the names are not limiting to their relative positions in any given configuration. Each housing 402, 404 may be made of one or more of any suitable material, such as plastic or metal, such as aluminum.

The illustrative mobile compute device 400 has a first display 502 (see FIG. 5) on the bottom housing 402 and a second display 504 on the top housing 404. The display 502 and display 504 may be any suitable display, such as a touchscreen display, a liquid crystal display, an LED display, etc.

FIG. 5 shows a top view of the mobile compute device 400 (right) with the hinge 410 with elliptical gears 406, 408 next to the mobile compute device 100 (left) with the hinge 110 with circular gears 302, 304. As discussed in more detail below in regard to FIGS. 6 & 7, the gap 506 between the displays 502, 504 may be smaller for the mobile compute device 400 with the elliptical gears 406, 408 than the corresponding gap 112 between the displays 106, 108 of the mobile compute device 100 with the circular gears 302, 304.

FIG. 6 shows a cross-sectional side view of the mobile compute device 400 (right) with the hinge 410 with elliptical gears 406, 408 next to a cross-sectional side view of the mobile compute device 100 (left) with the hinge 110 with circular gears 302, 304. As discussed in more detail in regard to FIG. 7, the fact that the elliptical gears 406, 408 provide more separation in the closed configuration than the book configuration allows for a smaller gap 502. As a result, the edges of the housings 402, 404 may be more squared-off as opposed to the rounded edges of the housings 102, 104.

Figure 7A:
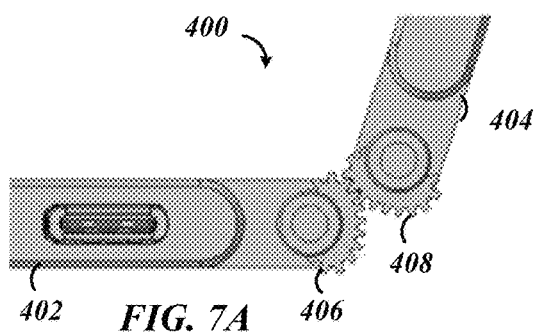
FIG. 7A is a side view of one embodiment of a dual display mobile compute device with elliptical hinges in a notebook or laptop configuration.
Figure 7B:
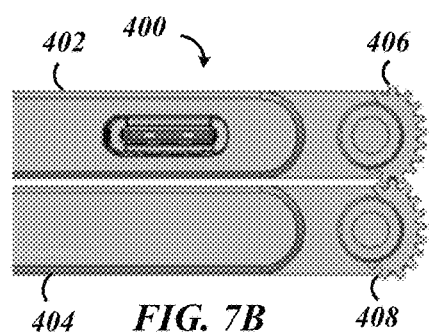
FIG. 7B is a side view of one embodiment of a dual display mobile compute device with elliptical hinges in a closed configuration.
Figure 7C:
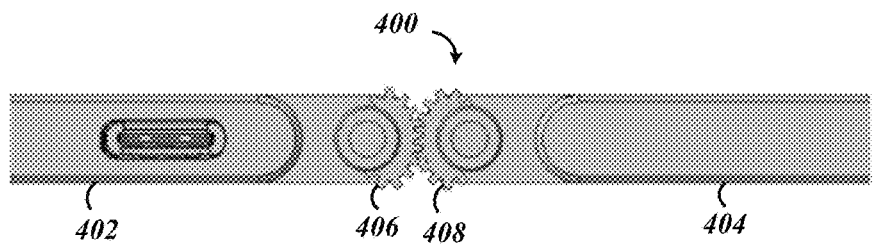
FIG. 7C is a side view of one embodiment of a dual display mobile compute device with elliptical hinges in a book configuration.

Referring now to FIG. 7, the mobile compute device 400 may be placed into several different configurations, such as a laptop configuration shown in FIG. 7A, a closed configuration shown in FIG. 7B, and a book configuration shown in FIG. 7C. The separation between the center of the bottom gear 406 of the bottom housing 402 and the center of the top gear 408 of the top housing 404 may change as the mobile compute device 400 enters different configurations. For example, the separation may be smaller when the mobile compute device 400 is in a book configuration as shown in FIG. 7C as comparted to the separation when the mobile compute device 400 is in a closed configuration as shown in FIG. 7B.

Figure 8A:
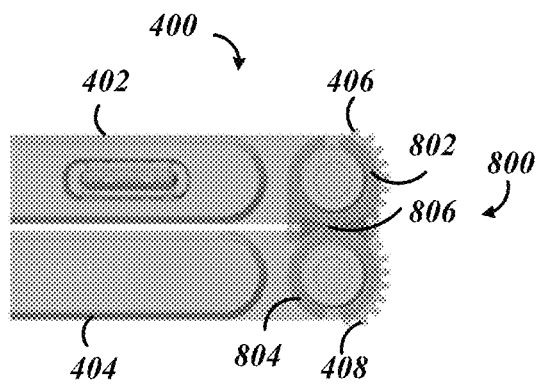
FIG. 8A is a side view of one embodiment of a dual display mobile compute device with elliptical hinges and a mechanical linkage in a closed configuration.
Figure 8B:
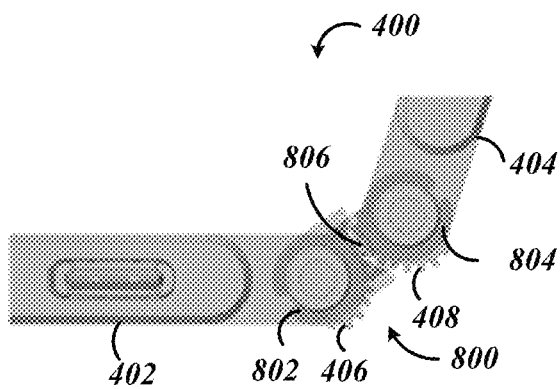
FIG. 8B is a side view of one embodiment of a dual display mobile compute device with elliptical hinges and a mechanical linkage in a notebook or laptop configuration.
Figure 8C:
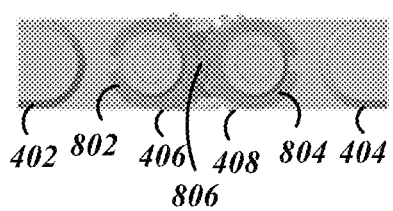
FIG. 8C is a side view of one embodiment of a dual display mobile compute device with elliptical hinges and a mechanical linkage in a book configuration.
Figure 9A:
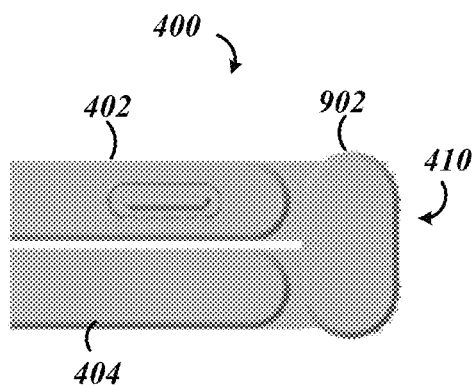
FIG. 9A is a side view of one embodiment of a dual display mobile compute device with elliptical hinges and a mechanical linkage covered by an enclosure in a closed configuration.
Figure 9B:
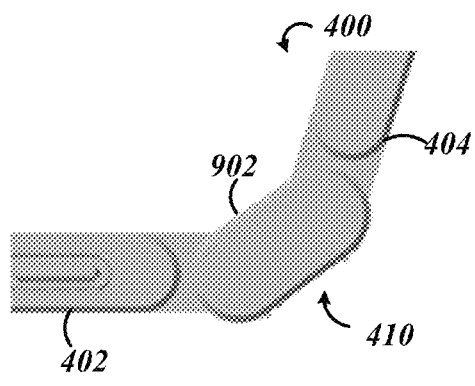
FIG. 9B is a side view of one embodiment of a dual display mobile compute device with elliptical hinges and a mechanical linkage covered by an enclosure in a notebook or laptop configuration.
Figure 9C:
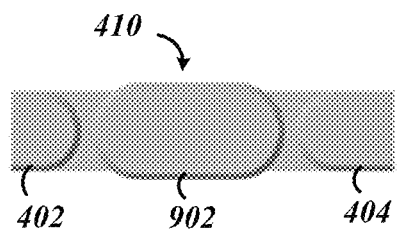
FIG. 9C is a side view of one embodiment of a dual display mobile compute device with elliptical hinges and a mechanical linkage covered by an enclosure in an open configuration.

Referring now to FIG. 8, the bottom gear 404 and the top gear 406 may be joined together with a mechanical linkage 800 made up of a bottom link 802, a top link 804, and a connector 806, such as a spring. In the illustrative embodiment, the bottom link 802 includes flanges which extend from the bottom link 802 towards top link 804 and the top link 804 includes flanges which extend from the top link 804 towards the bottom link 802. As shown in FIG. 8, in the illustrative embodiment, the flanges of the bottom link 802 are in contact with and contain the flanges of the top link 804 such that the bottom link 802 constrains rotation of the top link 804 relative to the bottom link 802, but the flanges do not prevent a change in the separation between the bottom link 802 and the bottom link 802. As a result, the links 802, 804 do not inhibit the change in separation that occurs between the centers of the gears 406, 408 as the top housing 404 is rotated relative to the bottom housing 402. In the illustrative embodiment, the links 802, 804 apply a frictional force to the gears 802, 804 such that the top housing 404 can be held in place, such as when the mobile compute device 400 is in a laptop configuration. The links 802, 804 may made from any suitable material, such as metal, aluminum, plastic, rubber, etc.

The connector 806 connects the bottom gear 406 and the top gear 408. The connector 806 applies a force to the bottom gear 406 and the top gear 408 such that the two gears 406, 408 remain in contact. In the illustrative embodiment, the connector 806 is attached directly to the links 802, 804 and applies a force to the gears 406, 408 through the links 802, 804. In other embodiments, the connector 806 may apply force to the gears 406, 408 in a different way. In the illustrative embodiment, the connector 806 is a spring, such as a spring made out of piano wire or spring steel. In other embodiments, the connector 806 may be any object that applies a suitable force to the gears 406, 408 over a desired range of motion, such as a connector 806 made from a stretchable bulk material. The connector 806 may made from any suitable material, such as metal, plastic, rubber, etc.

Referring now to FIG. 10, the hinge 410 may be covered by an enclosure 902. The enclosure 902 may cover the hinge 410 to prevent dust or other contaminants from disrupting the operation of the hinge and to protect the hinge 410. In the illustrative embodiment, the enclosure 902 may be an elastomer enclosure that expands and contracts along with the links 802, 804. In other embodiments, the enclosure 902 may be made of another flexible material, such as plastic, rubber, polymer, thermoplastic elastomer, silicone rubber, etc., or may be of a fixed shape that can accommodate the links 802, 804 at their largest separation.

EXAMPLES

Illustrative examples of the technologies disclosed herein are provided below. An embodiment of the technologies may include any one or more, and any combination of, the examples described below.

Example 1 includes a mobile compute device comprising a top housing comprising a display; a bottom housing; and a hinge connected to one edge of the bottom housing and one edge of the top housing, the hinge comprising a first non-circular gear connected to the bottom housing; and a second non-circular gear connected to the top housing and engaged with the first non-circular gear.

Example 2 includes the subject matter of Example 1, and wherein the first non-circular gear is an elliptical gear and wherein the second non-circular gear is an elliptical gear.

Example 3 includes the subject matter of any of Examples 1 and 2, and wherein the first gear and second gear are positioned such that the center of the gears are separated by the sum of the minor axes of the bottom and top gears when the mobile compute device is in a book configuration.

Example 4 includes the subject matter of any of Examples 1-3, and wherein the bottom housing comprises a second display.

Example 5 includes the subject matter of any of Examples 1-4, and wherein the hinge further comprises a linkage joining the first non-circular gear and the second non-circular gear, wherein the linkage comprises a bottom link and a top link, wherein the bottom link comprises two flanges which extend from the bottom link towards top link, and wherein the top link comprises two flanges which extend from the top link towards the bottom link and are contained by the flanges of the bottom link such that the bottom link constrains rotation of the top link relative to the bottom link.

Example 6 includes the subject matter of any of Examples 1-5, and wherein the hinge further comprises a connector configured to apply a force to the first gear and the second gear to keep the first gear in contact with the second gear.

Example 7 includes the subject matter of any of Examples 1-6, and wherein the connector is a spring.

Example 8 includes the subject matter of any of Examples 1-7, and wherein the hinge further comprises an elastomer enclosure covering the first and second gears, the linkage, and the connector.

Example 9 includes the subject matter of any of Examples 1-8, and further including a processor; and a memory.

Example 10 includes a mobile compute device comprising a hinge connected to one edge of a first housing of the mobile compute device and to one edge of a second housing of the mobile compute device, wherein the first housing of the mobile compute device comprises a display, the hinge comprising a first non-circular gear connected to the first housing; and a second non-circular gear connected to the second housing and engaged with the first non-circular gear.

Example 11 includes the subject matter of Example 10, and wherein the first non-circular gear is an elliptical gear and wherein the second non-circular gear is an elliptical gear.

Example 12 includes the subject matter of any of Examples 10 and 11, and wherein the first gear and second gear are positioned such that the center of the gears are separated by the sum of the minor axes of the bottom and top gears when the mobile compute device is in a book configuration.

Example 13 includes the subject matter of any of Examples 10-12, and wherein the hinge further comprises a linkage joining the first non-circular gear and the second non-circular gear, wherein the linkage comprises a bottom link and a top link, wherein the bottom link comprises two flanges which extend from the bottom link towards top link, and wherein the top link comprises two flanges which extend from the top link towards the bottom link and are contained by the flanges of the bottom link such that the bottom link constrains rotation of the top link relative to the bottom link.

Example 14 includes the subject matter of any of Examples 10-13, and wherein the hinge further comprises a connector configured to apply a force the first gear and the second gear to keep the first gear in contact with the second gear.

Example 15 includes the subject matter of any of Examples 10-14, and wherein the connector is a spring.

Example 16 includes the subject matter of any of Examples 10-15, and wherein the hinge further comprises an elastomer enclosure covering the first and second gears, the linkage, and the connector.

Example 17 includes the subject matter of any of Examples 10-16, and further including the first housing; the second housing; a processor; and a memory.

Example 18 includes a mobile compute device comprising a top housing comprising a display; a bottom housing; a processor; a memory; and means for joining the bottom housing and the top housing such that the bottom housing can be rotated 360 degrees relative to the bottom housing, wherein the means for joining the bottom housing and the top housing comprises at least one non-circular gears.

Example 19 includes the subject matter of Example 18, and wherein the bottom housing comprises a second display.

Example 20 includes the subject matter of any of Examples 18 and 19, and wherein the at least one non-circular gear comprises at least one elliptical gear.

The invention claimed is:

1. A mobile compute device comprising:
   a top housing comprising a display;
   a bottom housing; and
   a hinge connected to one edge of the bottom housing and one edge of the top housing, the hinge comprising:
      a first non-circular gear connected to the bottom housing and comprising a first plurality of teeth, wherein each of the first plurality of teeth is adjacent another of the first plurality of teeth, wherein the first plurality of teeth are arranged in a non-circular shape; and
      a second non-circular gear connected to the top housing and engaged with the first non-circular gear, wherein the second non-circular gear comprises a second plurality of teeth, wherein each of the second plurality of teeth is adjacent another of the second plurality of teeth, wherein the second plurality of teeth are arranged in a non-circular shape.

2. The mobile compute device of claim 1, wherein the first non-circular gear is an elliptical gear and wherein the second non-circular gear is an elliptical gear.

3. The mobile compute device of claim 2, wherein the first gear and second gear are positioned such that the center of the gears are separated by the sum of the minor axes of the bottom and top gears when the mobile compute device is in a book configuration.

4. The mobile compute device of claim 1, wherein the bottom housing comprises a second display.

5. The mobile compute device of claim 1, wherein the hinge further comprises:
   a linkage joining the first non-circular gear and the second non-circular gear, wherein the linkage comprises a bottom link and a top link,
   wherein the bottom link comprises two flanges which extend from the bottom link towards top link, and
   wherein the top link comprises two flanges which extend from the top link towards the bottom link and are contained by the flanges of the bottom link such that the bottom link constrains rotation of the top link relative to the bottom link.

6. The mobile compute device of claim 5, wherein the hinge further comprises a connector configured to apply a force to the first gear and the second gear to keep the first gear in contact with the second gear.

7. The mobile compute device of claim 6, wherein the connector is a spring.

8. The mobile compute device of claim 1, further comprising:
   a processor; and
   a memory.

9. The mobile compute device of claim 1, wherein the first non-circular gear is fixed in position and orientation relative to the bottom housing, and wherein the second non-circular gear is fixed in position and orientation relative to the top housing.

10. The mobile compute device of claim 1, wherein a center of the first non-circular gear is separated from a center of the second non-circular gear by a first distance when the mobile compute device is in a closed configuration and by a second distance different from the first distance when the mobile compute device is in a book configuration.

11. A mobile compute device comprising:
   a hinge connected to one edge of a first housing of the mobile compute device and to one edge of a second housing of the mobile compute device, wherein the first housing of the mobile compute device comprises a display, the hinge comprising:
      a first non-circular gear connected to the first housing; and
      a second non-circular gear connected to the second housing and engaged with the first non-circular gear.

12. The mobile compute device of claim 11, wherein the first non-circular gear is an elliptical gear and wherein the second non-circular gear is an elliptical gear.

13. The mobile compute device of claim 12, wherein the first gear and second gear are positioned such that the center of the gears are separated by the sum of the minor axes of the bottom and top gears when the mobile compute device is in a book configuration.

14. The mobile compute device of claim 11, wherein the hinge further comprises:
   a linkage joining the first non-circular gear and the second non-circular gear, wherein the linkage comprises a bottom link and a top link,
   wherein the bottom link comprises two flanges which extend from the bottom link towards top link, and
   wherein the top link comprises two flanges which extend from the top link towards the bottom link and are contained by the flanges of the bottom link such that the bottom link constrains rotation of the top link relative to the bottom link.

15. The mobile compute device of claim 14, wherein the hinge further comprises a connector configured to apply a force the first gear and the second gear to keep the first gear in contact with the second gear.

16. The mobile compute device of claim 15, wherein the connector is a spring.

17. The mobile compute device of claim 11, further comprising:
   the first housing;
   the second housing;
   a processor; and
   a memory.

18. A mobile compute device comprising:
   a top housing comprising a display;
   a bottom housing;
   a processor;
   a memory; and
   means for joining the bottom housing and the top housing such that the bottom housing can be rotated 360 degrees relative to the bottom housing,
   wherein the means for joining the bottom housing and the top housing comprises at least one non-circular gear.

19. The mobile compute device of claim 18, wherein the bottom housing comprises a second display.

20. The mobile compute device of claim 18, wherein the at least one non-circular gear comprises at least one elliptical gear.

* * * * *